United States Patent Office 2,862,801
Patented Dec. 2, 1958

2,862,801

GASOLINE FUELS

Earl G. De Witt, Royal Oak, Mich., assignor to Ethyl Corporation, New York, N. Y., a corporation of Delaware No Drawing. Application November 5, 1953
Serial No. 390,427

10 Claims. (Cl. 44—69)

This invention relates to compositions of matter containing phosphorus, sulfur, and chlorine and more particularly to β-(chloropropyl)-thionophosphate.

The employment of organic compounds containing phosphorus as addition agents to leaded hydrocarbon fuels of the gasoline boiling range has been found efficacious in minimizing deposit-induced engine problems such as wild ping and spark plug fouling. Generally speaking, these problems require an ignition control agent; that is, a material which provides the dual function of improving spark plug performance and reducing autoignition with a minimum of side effects.

An important property of a satisfactory addition agent for hydrocarbons of the gasoline boiling range is hydrocarbon solubility. The significance of this property is related both to problems associated with fuel blending and storage, and engine inductibility.

The hydrocarbon solubility of an additive should be high in diverse types of hydrocarbons, including straight run fuels; cracked fuels, resulting from thermal and catalytic processes; and other fuel types obtained from such processes as reforming, catalytic reforming, or alkylation. Such solubility should be high at ordinary temperatures to facilitate blending operations. Moreover, the solubility should be great under relatively broad temperature range, particularly in the case of lower temperatures so that storage problems such as separation of the addition agent from the fuel does not occur in storage tanks or vehicle fuel tanks subjected to extremely low temperatures. The problem of solubility is further complicated by the unavoidable presence of water in commercial fuel which frequently tends to reduce hydrocarbon solubility, promote extraction of the addition agent into the water phase, particularly if the agent is preferentially soluble in water, and destroy the addition agent as in the case of agents which are susceptible to hydrolysis.

Engine inductibility and effectiveness of the agent are the ultimate criteria for an addition agent, for if an additive is not suitably inducted into the combustion chamber manifestly it cannot exert its maximum effectiveness. Engine inductibility is related to hydrocarbon solubility. During manifolding more or less evaporation of the fuel occurs. Hence, it is preferred to provide additives which are soluble in the fuel to such an extent that the additive remains dissolved in the fuel, even after a substantial portion of the more volatile fuel components have vaporized in the induction system. Thus, induction system deposits of the additive are obviated and delivery of the additive to the combustion chamber in the desired amount and form is assured. Poor inductibility can cause several unexpected and undesirable ancillary problems, such as intake valve burning, intake port clogging, intake valve or seat deposits, loss of compression, and related deleterious effects. Thus, poor inductibility as a result of improper solubility of an otherwise acceptable additive, seriously limits advances in engine design. It is apparent, therefore, that by meeting the above and other critical criteria an addition agent can exert its maximum inherent effectiveness.

The problem of spark plug fouling is dependent upon a variety of factors, including the construction of the spark plug, the type and composition of the fuel, as well as the design of the engine and the conditions under which the engine is operated. Design of the engine and operation of the engine may be controlled to offset one series of problems, but in so doing the spark plug fouling problem may be aggravated. One such result is related to increasing the temperature of operation of the combustion chamber, frequently encountered when decreasing fuel/air ratio, and operating an engine under light load conditions. Both of these latter factors are becoming increasingly important, and many efforts have been made to permit operation of the engine satisfactorily under these conditions.

It is therefore an object of this invention to provide compositions of matter and methods for their manufacture having particular utility as addition agents to the fuel. A particular object of this invention is to provide ignition control compounds. It is a further object of this invention to provide methods of employing such compositions. Other objects of this invention will be apparent from the discussion hereinafter.

It has been found that the above and other objects of this invention are provided by β-(chloropropyl)-thionophosphate.

β-(Chloropropyl)-thionophosphate is prepared by reacting propylene oxide with a phosphorus trichloride in the presence of sulfur. It has been discovered that by reacting a mixture of propylene oxide, phosphorus trichloride, and elemental sulfur, a β-(chloropropyl)-thionophosphate is produced. The reaction product by this process comprises tris-(β-chloro-n-propyl)-thionophosphate, tris-(β-chloroisopropyl)-thionophosphate, di-(β-chloro-n-propyl)-(β-chloroisopropyl)-thionophosphate, and di-(β-chloroisopropyl)-(β-chloro-n-propyl)-thionophosphate. The foregoing nomenclature is preferred. However, for convenience the class of compounds having the general empirical formula $(RO)_3PS$ is sometimes referred to as thiophosphates. Thus, a material of this invention may be referred to as a β-(chloropropyl)-thiophosphate. For purposes of clarity, this invention relates to material having the formula $(C_3H_6ClO)_3PS$.

The process for preparing the β-(chloropropyl)-thionophosphates of this invention comprises the concomitant reaction of propylene oxide, phosphorus trichloride, and elemental sulfur. This reaction is evidenced by release of heat. By this process a product is formed which is particularly suited for use as a fuel additive. The order of addition of reactants is not critical. However, it is important to assure that all three reactants are present, regardless of the mode of addition, at least as soon as the mixture has reached a temperature at which substantial reaction occurs. Thus, a mixture of elemental sulfur and phosphorus trichloride in reaction proportions can be introduced to a reaction vessel followed by the addition thereto of the propylene oxide. The mixture of the two reactants can be previously heated to the reaction temperature and the propylene oxide added at such a rate as to maintain the exothermic reaction at a temperature at which a desired rate occurs. Conversely, the propylene oxide and sulfur can be premixed and the phosphorus trichloride added thereto. When the propylene oxide and phosphorus trichloride are premixed, in order to obtain full benefit of this embodiment of the process of this invention, this mixture should not be maintained at a reaction temperature for an extended period of time prior to the addition of the elemental sulfur. When so conducted, and the sulfur is added to the mixture over a period of time, I prefer to commence addition of sulfur prior to the attainment of reaction temperature. In general, the reaction occurs favorably at a temperature between about 30° C. to 90° C. A preferred range is between about 50° C. and 80° C. The following examples, in which all parts and percentages are by weight, illustrate one method of effecting this process.

EXAMPLE I

To a jacketed vessel provided with heat transfer means, means for returning reflux, means for introducing reactants and providing agitation was added 32 parts of elemental sulfur as a suspension in 137.8 parts of phosphorus trichloride. The temperature of this mixture was increased to between 60 and 68° C., and 188 parts of propylene oxide was introduced with agitation at such a rate as to maintain the exothermic reaction at a temperature of about 80° C. while maintaining the agitation. Upon completion of the addition of propylene oxide the temperature was maintained by supplying heat for an additional period of 20 minutes at 60° C. After this period the temperature of the reaction product was reduced to about 25° C. and the mixture filtered. From the filtrate so-obtained excess propylene oxide was removed by distillation at reduced pressure while maintaining the reaction mixture at a temperature of 100° C. The residue was 322 parts of $\beta$-(chloropropyl)-thionophosphate corresponding to a yield of 94 percent of the theoretical. This product was found by chemical analysis to contain 9.02 percent phophorus, 9.07 percent sulfur, and 31.4 percent chlorine corresponding to the formula $C_9H_{18}Cl_3O_3PS$. The product had an index of refraction $(n_D^{21.5})$ of 1.4910 and distilled by simple one-plate distillation at a temperature of 140 to 160° C. at a pressure of one millimeter of mercury.

EXAMPLE II

To the apparatus described in Example I was added a mixture of 32 parts of elemental sulfur suspended in 137.8 parts of phosphorus trichloride. This mixture was heated with agitation to a temperature of 50° C. and thereupon 191.5 parts of propylene oxide was added in incremental proportions such as to maintain the temperature at about 50° C. After addition was complete the reaction mixture was increased to a temperature of 80° C. for a period of about 4 minutes. The slightly cloudy mixture was reduced to a temperature of about 25° C. and filtered, whereby 0.06 part of sulfur was recovered. Excess propylene oxide was removed as in the foregoing example providing a residue comprising a yield of $\beta$-(chloropropyl)-thionophosphate amounting to 96.7 percent of theoretical. The purity of this product was indicated by the refractive index $(n_D^{21.5})$ of 1.4894

EXAMPLE III

Using the procedure of Example II but maintaining the reaction temperature at 70° C. until reaction is complete which required a period of 20 minutes, 0.71 part of unreacted sulfur was recovered in the filtration step. The resulting product amounted to a yield of 97.8 percent of $\beta$-(chloropropyl)-thionophosphate having an index of refraction $(n_D^{21.5})$ of 1.4916.

EXAMPLE IV

In the apparatus described in Example I was added a mixture of 33.6 parts of elemental sulfur suspended in 137.8 parts of phosphorus trichloride. While agitating the mixture the temperature of this suspension was increased to 60° C. and maintained at this temperature while adding in increments 191.4 parts of propylene oxide. After addition was complete the temperature of the reaction mixture was maintained for an additional 20 minutes at about 60° C. After cooling the reaction mixture to a temperature of 25° C. the product was filtered to yield 1.78 parts of unreacted sulfur. The residual $\beta$-(chloropropyl)-thionophosphate corresponded to a yield of 96.9 percent of the theoretical. This product had an index of refraction $(n_D^{21.5})$ of 1.4918.

In the above process I can employ sulfur in an amount as low as one-half of one percent below the stoichiometric requirement. In this embodiment the slight excess of phosphorus trichloride employed appears to act as a catalyst for the reaction.

In general I prefer to employ temperatures between about 30 to 90° C. Below about 30° C. the reaction is too slow to be practical and above 90° C. the exothermic reaction is more difficult to control.

In each of the above examples of processes for manufacturing the $\beta$-(chloropropyl)-thionophosphates of this invention solvents can be employed. However, care should be taken that solvents so employed be inert to the reactants. Thus, organic solvents containing functional groups capable of reacting with the propylene oxide, the phosphorus trichloride or the sulfur should be avoided and in general anhydrous solvents are employed. Typical solvents include aliphatic and aromatic hydrocarbons such as mineral oils, white oils and the like, and chlorinated derivatives thereof, nitrobenzenes, ethers and the like. One preferred method of controlling the above highly exothermic processes comprises conducting the reaction in a medium comprising the product. In general the above processes are advantageously conducted at pressures corresponding to prevailing atmospheric pressure. If, however, it is desirable to employ a volatile solvent, pressure can be employed in order to achieve reaction temperature.

The following physical properties are representative of those obtained by preparing $\beta$-(chloropropyl)-thionophosphate by the foregoing procedures:

*Density*

| $d_4^{15}$ | $d_4^{20}$ | $d_4^{25}$ | $d_4^{30}$ |
|---|---|---|---|
| 1.2871 | 1.281$_7$ | 1.276$_4$ | 1.2710 |

The temperature co-efficient of the density expressed as grams per millimeter per °C. is 0.00107.

*Refractive index*

| $n_D^{15}$ | $n_D^{20}$ | $n_D^{25}$ | $n_D^{30}$ |
|---|---|---|---|
| 1.493$_3$ | 1.4912 | 1.489$_1$ | 1.4871 |

The temperature co-efficient of the index of refraction $(\Delta n/°C.)$ is 0.00041.

The viscosity of $\beta$-(chloropropyl)-thionophosphate is as follows:

| Temperature | | Viscosity, cp. |
|---|---|---|
| °C. | °F. | |
| −27.0 | −16.6 | 4,260 |
| +6.2 | +43.2 | 140 |
| +29.8 | +85.6 | 30.1 |

On careful distillation the boiling range of the product of my process is between about 140 and 160° C. at a pressure of one millimeter of mercury and the individual isomers boil at temperatures within this range.

The individual isomers of $\beta$-(chloropropyl)-thionophosphate are similarly identified by their respective physical properties of density, refractive index, and viscosity which for all practical purposes are the same as for the mixture. The reaction product obtained by my process comprises both iso and normal embodiments and of these the iso form predominates.

The individual isomers are characterized by having boiling points falling within the range of 140 to 160° C.

at one millimeter of mercury pressure. Within this range in order of increasing boiling point the isomers are respectively tris-(β-chloroisopropyl)-thionophosphate, di-(β-chloroisopropyl) - (β - chloro - n - propyl) - thionophosphate, di-(β-chloro-n-propyl)-(β-chloroisopropyl)-thionophosphate and tris-(β-chloro-n-propyl)-thionophosphate. Thus the isomers are separated by distillation of the fractions and are collected and identified by their physical properties as enumerated above in order of increasing boiling point. A particularly suitable method for the separation and purification of the isomers of β-(chloropropyl)-thionophosphate comprises chromatographic adsorption. The mixture and the individual isomers are water-white liquids having a characteristic odor and are stable under normal conditions of storage and exposure. It has been found that the mixture as produced above, the individual isomers and mixtures thereof possess properties which make them admirably suited for use as fuel additives.

β-(Chloropropyl)-thionophosphate possesses unusual hydrocarbon solubility. This solubility is greater than would be expected by a knowledge of the solubility properties of apparently closely related materials previously known. This solubility is such that fuel compositions containing this material as an additive not only are stable under conditions of storage under a wide variation of temperature conditions but also have the additional important property of being inductible in use in an automotive engine. The above referred to closely related materials previously known present difficulties of induction which seriously hinder their utility under certain conditions of use.

The complexities of intake manifolding in modern multi-cylinder engines present distribution difficulties. Because of such manifolding problems the individual cylinders of the engine receive disproportionate amounts of fuel. Thus, when the total fuel is inducted, the additive is disproportionately introduced into the various cylinders.

Thus, it is seen that it is important to provide an additive effective over a wide range of concentrations such that the cylinders receiving the least amount will still benefit from the additive, while those cylinders receiving the greater amount will not only receive the full benefit of the additive but do so with a minimum of side effects. One such undesirable side effect particularly noticeable with some additives at higher concentrations, is antiknock destructiveness. I have found that β-chloropropylthionophosphate possesses these desirable properties to an unexpectedly high degree. Thus, the combination of good inductibility, high effectiveness at low concentration, continued effectiveness at high concentration, and substantially no anti-knock destructiveness provides a superior additive not only under present conditions but permits improved engine design, fuel design, and engine operation.

To demonstrate the solubility in hydrocarbons, three typical fuels were employed. The first of these was isooctane of standard reference fuel grade. A commercially available blend of a commercial blend of straight-run, catalytically cracked and polymer blending stocks was chosen as a second representative fuel type. The third fuel selected is representative of a typical 100 percent catalytically cracked fuel and was likewise derived from an existing commercial source. For convenience hereinafter these fuels shall be referred to respectively as fuel A, B, and C. The characteristics of each of the above fuels are shown in Table I.

*Table I*

|  | Fuel A | Fuel B | Fuel C |
|---|---|---|---|
| Olefins | | 25.5% | 25.9%. |
| Aromatics | | 20.6% | 33.7%. |
| Saturates | 100.0% | 53.9% | 40.4%. |
| TEL content | None | 0.02 ml./gal | None. |
| Bromine content | do | 0.064 g./gal | Do. |
| Chlorine content | do | None | Do. |
| Dissolved gum (ASTM D-381) | do | 1.8 mg./100 ml | 4.9 mg./100 ml. |
| Oxidation stab. (ASTM D-525) | 1,440 minutes | 420 minutes | 1,440 minutes. |
| Total sulfur (ASTM D-90) | Less than 0.01 weight percent | 0.068 weight percent | 0.074 weight percent. |
| Gravity (ASTM D-287) | 69.5° API | 61.4° API | 56.0° API. |
| Reid vap. pr. (ASTM D-323) | 1.9 p. s. i. a | 8.6 p. s. i. a | 6.2 p. s. i. a. |
| Lead response,[1] ml. TEL/gal.: | | | |
| 0.00 | | | [2] 80.1    [2] 91.1₅ |
| 0.02 | | [2] 76.8    [2] 83.7 | |
| 0.5 | | 79.5    88.0 | 82.4    94.0₅ |
| 1.5 | | 81.9    91.8 | 84.0    95.8₅ |
| 3.0 | | 83.9    94.5 | 85.7    97.4₅ |
| Distillation range: | | | |
| Initial boiling point | 198° F | 98° F | 105° F. |
| 5% | 206° F | 123° F | 128° F. |
| 10% | 206° F | 139° F | 139° F. |
| 15% | | 153° F | 147° F. |
| 20% | | 166° F | 155° F. |
| 30% | | 190° F | 175° F. |
| 40% | | 210° F | 200° F. |
| 50% | 207° F | 229° F | 230° F. |
| 60% | | 247° F | 265° F. |
| 70% | | 269° F | 302° F. |
| 80% | | 296° F | 340° F. |
| 85% | | 313° F | 361° F. |
| 90% | 208° F | 333° F | 382° F. |
| 95% | 208° F | 359° F | 404° F. |
| End point | 260° F | 402° F | 425° F. |
| Residue | 0.3% | 1.0% | 1.0%. |
| Loss | 0.0% | 1.0% | 0.0%. |

[1] The first value shown was obtained by the motor method (ASTM D-357) whereas the second value was obtained by the research method (ASTM D-908).
[2] Octane number.

The test procedure to demonstrate the remarkable solubility of β-(chloropropyl)-thionophosphate consisted of preparing saturated solutions of the additive in each of the above fuels. This was done by shaking excess solute in 30 parts by volume of solvent for at least two hours in a constant temperature bath and then cooling the stirred solutions while noting the temperatures at which a second liquid phase appeared. The data so obtained are shown in Table II.

Table II

[Solubility of β-(chloropropyl)-thionophosphate (gm. additive per gallon of fuel).]

| Temperature, °C. | Fuel A | Fuel B | Fuel C |
|---|---|---|---|
| −40 | | 710 | |
| −30 | 50 | 2,040 | |
| −20 | 140 | ∞ | ∞ |
| −10 | 250 | ∞ | ∞ |
| 0 | 460 | ∞ | ∞ |
| +5 | 590 | ∞ | ∞ |
| +10 | 1,020 | ∞ | ∞ |
| +15 | ∞ | ∞ | ∞ |
| +20 | ∞ | ∞ | ∞ |
| +25 | ∞ | ∞ | ∞ |

In Fuel A this material is soluble in all proportions above 12.7° C.
In Fuel B this material is soluble in all proportions above −24.9° C.
In Fuel C this material is soluble in all proportions above −38° C.

The above favorable and unexpected solubility properties of the isomeric β-(chloropropyl)-thionophosphates and mixtures thereof can be advantageously utilized in preparing fuels containing this material as an additive. Thus concentrated hydrocarbon solutions of β-(chloropropyl)-thionophosphate can be prepared, such solutions being stable to temperature changes over all ranges encountered in storage. Such concentrated solutions can be employed in further blending or diluting to concentrations useful for improving engine operation employing such fuel. However, such concentrates need not be first prepared as it has been established that β-(chloropropyl)-thionophosphate not only dissolves to a high degree in hydrocarbon fuels but also by its physical characteristics dissolves readily in hydrocarbon fuels. In many refinery blending operations special techniques are required to disperse and dissolve various materials in fuels. It has been found, however, that β-(chloropropyl)-thionophosphate can by a simple blending operation be completely and immediately uniformly distributed as a stable solution in the desired proportions in a hydrocarbon fuel. It is recognized in the refinery art that fuels themselves can be blended to impart various desirable properties such as volatility, octane number, stability and the like to the finished fuel. The above-mentioned high solubility of β-(chloropropyl)-thionophosphate, contrary to experience with other fuel additives designed for the same purpose, permits selected blending stocks to be treated with β-(chloropropyl)-thionophosphate in concentrations higher than those to be employed in the finished fuel. These treated blending stocks can thereupon be blended with a variety of refinery streams or can be transported as such to other locations for further blending. This advantageous and economical method of employing β-(chloropropyl)-thionophosphate is not easily or readily achieved with many closely related materials, for example with the ethyl homologue which might otherwise have some properties in common. Any of the usual blending techniques can be employed, such as for example jet mixing, simple agitation, convergent flow and the like.

It has been found that β-(chloropropyl)-thionophosphate can be blended with a variety of hydrocarbon base stocks and fuels, particularly those suitable for use in an internal combustion spark ignition engine. It has been further found that this material can be blended with fuels containing other additives, notable among which are lead alkyls such as tetramethyllead, tetraethyllead, dimethyldiethyllead, methyltriethyllead, ethyltrimethyllead, tetraphenyllead and the like, various halogenated scavengers such as ethylene dichloride, ethylene dibromide, dibromotoluene, trichlorobenzene and the like. Typical antiknock additive compositions which can be employed in conjunction with the additive of this invention are described, for example, in U. S. 1,592,954; 1,668,022; 2,364,921; 2,398,281; 2,479,900; 2,479,901; 2,479,902; 2,479,903; and 2,496,983. In addition the fuels can be employed with a variety of antioxidants, stabilizers, rust inhibitors, de-icing compositions, fuel dyes, antiknock additive dyes and the like.

Furthermore, by virtue of the presence of three chlorine atoms in the molecule of β-(chloropropyl)-thionophosphate all or part of such chlorine scavenger can be replaced by the chlorine in the material of this invention. Likewise, finished fuels containing advantageously higher proportions of chlorine can be provided by incorporating β-(chloropropyl)-thionophosphate into fuels along with tetraethyllead-containing antiknock mixtures having the conventional quantities of halogen scavengers. Furthermore the material of this invention can be pre-blended with a variety of organic halogen scavengers for incorporation into fuel containing tetraethyllead. This material is thus compatible with a wide variety of fuel additives.

I have found that an improved fuel for spark ignition internal combustion engine comprising petroleum hydrocarbons of the gasoline boiling range prepared by catalytic cracking techniques containing a tetraethyllead antiknock additive comprising tetraethyllead, ethylene dichloride and ethylene dibromide is obtained by incorporating therein β-(chloropropyl)-thionophosphate in an effective amount sufficient to reduce deposit-induced autoignition. In general such effective amount is at least 0.05 theory of phosphorus wherein one theory of phosphorus is the stoichiometric equivalent of the lead present. Thus two atoms of phosphorus is the stoichiometric equivalent of three atoms of lead. Since one theory of phosphorus is equivalent to a phosphorus-to-lead atom ratio of 2:3, one-tenth of a theory of phosphorus is one-tenth of this ratio—i. e., 0.2:3. Hence, it is seen for example that 0.2 and 0.5 theory of phosphorus are equivalent to phosphorus-to-lead atom ratios of 0.4:3 and 1:3, respectively. In general I prefer to employ up to about 0.4 theory of phosphorus although for some purposes as much as 0.5 theory may be employed. However, under certain conditions this upper limit may lead to secondary disadvantageous effects.

A requirement for an effective fuel additive is that it be hydrolytically stable. Fuels and their components during manufacturing, blending and transportation, as well as and particularly during storage, are brought into contact with water. Furthermore, such water may contain dissolved materials normally exerting a catalytic effect promoting decomposition of a number of fuel additives which have been proposed. It has been found that β-(chloropropyl)-thionophosphate is extremely stable to hydrolysis. This property can be strikingly demonstrated by contacting fuels containing this additive with moist air for extended periods. Furthermore, contact under conditions of elevated temperature with acid and other unusually degradative materials has failed to seriously affect the additive in fuel and the complete fuel maintains the properties imparted by the addition of the additive.

As noted, deposit-induced autoignition is a different phenomenon from ordinary knock. This phenomenon, sometimes referred to as "wild ping" is an erratic, uncontrolled ignition ordinarily occurring at a different period in the combustion cycle than ordinary combustion induced by the spark. Wild ping manifests itself both as an audible and an inaudible uncontrolled combustion. To demonstrate the important property associated with β-(chloropropyl)-thionophosphate of reducing, suppressing or eliminating deposit-induced autoignition or wild ping, a commercial hydrocarbon fuel treated with this additive and a second portion of the same hydrocarbon fuel treated only with the conventional antiknock mixture were subjected to a test procedure involving the use of a single cylinder test engine. This engine was equipped with an L-head cylinder and an electronic wild ping counter which records the total number of wild pings which have occurred during the test periods. Since deposit-induced ignition is the tendency of deposits to ignite the fuel-air mixture erratically and to produce uncontrolled combustion noticeable as antoignition, wild ping, preignition, etc., the electronic counter, which is used in conjunction with an ionization gap, automatically detects and records uncontrolled combustion. This 40-hour, short term test starts with a clean combustion chamber and provides average rate of deposit ignitions. The test is used primarily for screening fuel additives. Operation is summarized below.

| Load | Idle | Full Throttle |
|---|---|---|
| Cycle duration, seconds | 50 | 150 |
| Speed, r. p. m | 600 | 900 |
| Fuel-air ratio | 0.087 | 0.077 |
| Ignition timing | | TDC |
| Coolant temperature, ° F | | 148 |
| Oil temperature, ° F | | 160 |
| Intake air temperature, ° F | | 110 |
| Compression ratio | | 7.0:1 |
| Test duration, hours | | 40 |

Engine assembly involves a clean combustion chamber, induction system, and crankcase. Primary observations are the deposit-induced autoignition rate and induction system cleanliness. The above commercial premium-grade fuel base stock, plus 3.0 ml./gal. tetraethyllead as a fluid containing ethylene dichloride, ethylene dibromide and tetraethyllead in such proportions that 0.5 theory of ethylene dibromide and 1.0 theory of ethylene dichloride are present, was treated with 0.35 gram per gallon of β-(chloropropyl)-thionophosphate, corresponding to 0.1 theory of phosphorus. Upon addition of the additive and gentle agitation a homogeneous, clear fuel blend was obtained. This fuel was thereupon employed in the above-described engine under identical conditions.

It was established that the reduction in wild ping compared to operation of the engine on the fuel in the absence of β-(chloropropyl)-thionophosphate was 70 percent. Similarly, at higher concentrations, for example 0.2 theory of phosphorus, a reduction of 79 percent was obtained. At the extremely low concentration of 0.05 theory of phosphorus as β-(chloropropyl)-thionophosphate a reduction of wild ping of approximately 60 percent was obtained over that obtained with the conventional fuel. In contrast, when the same fuel was employed containing 0.1 and 0.2 theory of phosphorus as tricresyl phosphate, reductions of wild ping of only 45 and 63 percent, respectively, were obtained. Thus it can be seen that as much as four times the quantity of tricresyl phosphate must be employed to obtain the same reduction in wild ping obtained by employing β-(chloropropyl)-thionophosphate at 0.05 theory of phosphorus.

Determination of the wild ping effectiveness of the individual isomers: tris - (β - chloroisopropyl) - thionophosphate; di - (β - chloroisopropyl) - (β - chloro - n - propyl) - thionophosphate; di - (β - chloro - n - propyl) - (β-chloroisopropyl) - thionophosphate and tris - (β - chloro-n-propyl)-thionophosphate and mixtures thereof such that the total amount of phosphorus corresponds to between .05 and 0.4 theory of phosphorus demonstrates that it is the β-(chloropropyl)-thionophosphate grouping responsible for the remarkable reduction achieved in accordance with this invention. Thus the individual isomers and mixtures thereof in widely varying proportions are comparable in effectiveness with the reaction product produced by my process.

In general the best overall results are obtained with amounts of about 0.1 to about 0.3 theory of phosphorus. Thus in fuels containing up to about 3 milliliters of tetraethyllead per gallon it is preferred to employ up to about 0.2 theory of β-(chloropropyl)-thionophosphate per gallon. Under some conditions of use, notably in aircraft fuels, there is up to about 6 milliliters of tetraethyllead per gallon. In such fuels a correspondingly greater amount of β-(chloropropyl)-thionophosphate can be employed. The foregoing upper concentration limits of lead alkyl in fuel correspond to existing maximum concentrations recognized in the art. However, it is becoming increasingly apparent that further advantages are to be obtained by employing even greater amounts of organolead antiknock agents in fuel, particularly with the advent of the modern high compression engine. Thus the maximum concentrations of lead alkyl described above are based primarily on practical considerations. Because of the enhanced properties of my addition agents discussed hereinabove it will be appreciated therefore that they can be successfully utilized with higher concentrations of tetraethyllead and the like than above-described in both motor and aviation fuels, should such concentrations be deemed advisable. Indeed one method of employing β-(chloropropyl)-thionophosphate of this invention is in the form of an improved antiknock additive for addition to fuels for use in automotive and aircraft engines. Thus in the former the fluid comprises β-(chloropropyl)-thionophosphate, tetraethyllead, a chlorine scavenger such as ethylene dichloride, a bromine scavenger such as ethylene dibromide, identifying dyes and minor amounts of diluent. In the latter the improved fluids comprises β-(chloropropyl)-thionophosphate, tetraethyllead, a bromine scavenger such as ethylene dibromide, identifying dyes and a minor proportion of inert diluent. It is preferred for automotive fluids to employ chlorine in amount corresponding to 1.0 theory of scavenger, bromine in amount equivalent to 0.5 theory of scavenger and β-(chloropropyl)-thionophosphate in amount equivalent to between about 0.1 and 0.4 theory of phosphorus, and while 0.5 theory can be used, greater quantities than this should be avoided. In the aviation fluid it is preferred to employ bromine in amount equivalent to 1.0 theory of scavenger and β-(chloropropyl)-thionophosphate in amount equivalent to between about 0.1 and 0.4 theory of phosphorus.

It has been noted previously that β-(chloropropyl)-thionophosphate is extraordinarily soluble in hydrocarbon fuels in concentrations greater than that chosen for actual blending into a practical fuel designed to reduce or suppress deposit-induced autoignition or wild ping. This solubility is advantageous in providing an effective ignition control compound. It has been demonstrated that under conditions whereby deposits tend to be eliminated in the manifold system β-(chloropropyl)-thionophosphate is inducted completely. Under similar conditions other additives proposed for this purpose have deposited on the intake manifold and other portions of the intake system because of evaporation of the fuel prior to induction. For this purpose a demonstration was made employing three modern multicylinder engines operated at 2000 R. P. M. idle. This 100-hour test starts with a clean combustion chamber, induction system, and crankcase. Intake manifold branch temperatures are observed hourly to assure comparable fuel induction. A detailed inspection of the induction system at the end of the test is used as the criterion of fuel additive inductibility. Operation is summarized below.

| | |
|---|---|
| Load | Idle. |
| Speed, R. P. M | 2000. |
| Fuel-air ratio | 0.072. |
| Ignition timing | 2° BTC. |
| Compression ratio | 7.0:1. |
| Test duration, hours | 100. |

To establish a base line in the above demonstration a commercial aviation grade base stock gasoline containing 3.0 milliliters per gallon of tetraethyllead as a fluid containing ethylene dichloride, ethylene dibromide and tetraethyllead in such proportions that 0.5 theory of ethylene dibromide and 1.0 theory of ethylene dichloride are present was employed as a fuel for a period of 100 hours. At the end of the test period the induction system is critically inspected to establish base line conditions.

To the above identified fuel was added β-(chloropropyl)-thionophosphate in amount corresponding to 0.2 theory of phosphorus and the engine operated as before for a period of 100 hours. Critical inspection of the induction system including the inlet ports and the inlet valves indicated that the engine was in condition comparable to that resulting from the use of the conventional fuel alone. That is, there was no evidence of deposit due to the β-(chloropropyl)-thionophosphate.

Some materials suggested for use as additives to reduce deposit-induced autoignition while they may have the ability under certain conditions to so operate, under severe conditions are not fully inducted in the engine and, therefore, cannot exert the maximum effectiveness normally anticipated from the use. Such a deposit is particularly laid down in the inlet ports. The nature of such deposits is that even a minor amount of deposit returned to the intake system by flow back is trapped, leading to a magnification of the deposit with its attendant increased deleterious effects.

Similar fuel mixtures prepared with the following materials when employed in the above-described engine in amount corresponding to 0.1 theory of phosphorus and under the identical conditions likewise result in a clean induction system: tris-(β-chloroisopropyl)-thionophosphate; di-(β-chloroisopropyl)-(β-chloro-n-propyl)-thionophosphate; di-(β-chloro-n-propyl)-(β-chloroisopropyl)-thionophosphate and tris-(β-chloro-n-propyl)-thionophosphate. Similar results are obtained when employing a mixture of 80 weight percent di-(β-chloroisopropyl)-(β-chloro-n-propyl)-thionophosphate and 20 weight percent di-(β-chloro-n-propyl)-(β-chloroisopropyl)-thionophosphate corresponding to a total of 0.2 theory of phosphorus; 50 weight percent di-(β-chloroisopropyl)-(β-chloro-n-propyl)-thionophosphate, and 50 weight percent tris-(β-chloro-n-propyl)-thionophosphate in amount corresponding to 0.15 theory of phosphorus; 67 weight percent tris-(β-chloroisopropyl)-thionophosphate, and 33 weight percent tris-(β-chloro-n-propyl)-thionophosphate corresponding to a total of 0.3 theory of phosphorus; 33 weight percent tris-(β-chloroisopropyl)-thionophosphate, 33 weight percent di-(β-chloroisopropyl)-(β-chloro-n-propyl)-thionophosphate, and 33 weight percent di-(β-chloro-n-propyl)-(β-chloroisopropyl)-thionophosphate corresponding to a total of 0.4 theory of phosphorus and a mixture of equal parts of tris-(β-chloroisopropyl)-thionophosphate, di-(β-chloroisopropyl)-(β-chloro-n-propyl)-thionophosphate, di-(β-chloro-n-propyl)-(β-chloroisopropyl)-thionophosphate and tris-(β-chloro-n-propyl)-thionophosphate in an amount corresponding to a total of 0.15 theory of phosphorus.

It has long been a goal of engine manufacturers, particularly manufacturers of passenger car automotive engines, to provide an optimum combination of fuel economy and engine efficiency. One means of achieving this is the use of lean mixtures, or low fuel/air ratios. Unfortunately, the prevalence of deposit-induced autoignition or wild ping has made it desirable to use richer, full throttle fuel/air ratios than would otherwise be employed, with a consequent loss in fuel economy. Many additives have been proposed to overcome wild ping. However, such additives themselves introduce secondary complicating factors, included among which are induction system deposits caused by poor inductibility, anti-knock destruction, and the like. Poor engine inductibility requires that the additive be employed in greater amount than ideally required to overcome the wind ping problem. Such increased amounts conversely increase the effect of antiknock destruction. Thus, increased octane number is required, which in turn requires increased concentration of tetraethyllead, and the cycle is completed by this increase itself increasing the wild ping problem.

I have found that tris-β-(chloropropyl)-trionophosphate provides a solution to this problem which benefits each of the aforementioned facets of the problem and thus is a superior ignition control compound. In addition, I obtain the added unexpected benefit of increasing spark plug life to an extent not heretofore achieved with a practical ignition control compound.

To demonstrate this property, a series of modern high compression V-8 automotive engines were operated at lean fuel/air ratio under conditions encountered in metropolitan driving. These conditions include light duty operation with a limited top speed. These two factors of lean fuel/air ratio and metropolitan driving conditions are encountered to an increasingly great extent, and provision for a means of satisfactorily accomplishing these conditions has been a long-felt want in the industry. In the first series of demonstrations eight automobiles were operated on a commercially available automotive fuel containing 3 ml. of TEL per gallon as an automotive fuel additive comprising 1.0 theory of chlorine as ethylene dichloride and 0.5 theory of bromine as ethylene dibromide. The average distance travelled by the automobile for the first three spark plug failures caused by failure of shunt resistance was 1200 miles. This demonstration was repeated employing the same fuel which contained, in addition, 0.2 theory of tricresylphosphate, an additive suggested for reduction of wild ping. Under these conditions four sets of spark plugs showed the first three failures at an average of 1570 miles. In contrast, the same fuel containing 0.2 theory of phosphorus as β-chloropropyl-thionophosphate was employed under the same driving conditions for a distance of 2600 miles before the first three spark plug failures occurred. Thus, an increase of 70 percent in spark plug life was achieved over that obtained with tricresylphosphate, or over 100 percent increase compared to the reference fuel.

In a second series of demonstrations a group of cars having a different high compression V-8 engine of higher horsepower were employed. Under identical test conditions spark plug life was increased twofold by employing 0.2 theory of phosphorus as β-chloropropylthionophosphate compared to the spark plug life resulting from the use of the same base fuel to which had been added 0.2 theory of phosphorus as tricresylphosphate. The actual mileage achieved in the automobiles employing fuel containing the additive of this invention was over 5100 miles before spark plug failure was evidenced.

Having described the novel compounds of this invention and methods for their manufacture and use, I do not intend to be limited in the scope of this invention except as in terms of the appended claims.

I claim:

1. A fuel composition suitable for use in spark ignition internal combustion engines consisting essentially of a liquid petroleum hydrocarbon fuel of the gasoline boiling range, an antiknock quantity of an organolead antiknock agent, and β-(chloropropyl)-thionophosphate, the phosphorus-to-lead atom ratio being from about 0.1:3 to about 1:3.

2. A fuel composition suitable for use in spark ignition internal combustion engines consisting essentially of a liquid petroleum hydrocarbon fuel of the gasoline boiling range, an antiknock quantity of a lead alkyl antiknock agent, an organic halide scavenger capable of reacting with the lead during combustion in the engine to form relatively volatile lead halide, and β-(chloropropyl)-thionophosphate, the phosphorus-to-lead atom ratio being from about 0.1:3 to about 1:3.

3. Gasoline containing an antiknock quantity of tetraethyllead, a halogen scavenger comprising ethylene dibromide and ethylene dichloride, and β-(chloropropyl)-thionophosphate, the phosphorus-to-lead atom ratio being from about 0.1:3 to about 1:3.

4. A fuel adjuvant consisting essentially of a lead alkyl antiknock agent and β-(chloropropyl)-thionophosphate, the phosphorus-to-lead atom ratio being from about 0.1:3 to about 1:3.

5. An antiknock additive for use in gasoline consisting essentially of a lead alkyl antiknock agent, an organic halide scavenger capable of reacting with the lead during combustion in the engine to form relatively volative lead halide, and β-(chloropropyl)-thionophosphate, the phosphorus-to-lead atom ratio being from about 0.1:3 to about 1:3.

6. A fuel composition suitable for use in spark ignition internal combustion engines consisting essentially of a liquid petroleum hydrocarbon fuel of the gasoline boiling range, an antiknock quantity of tetraethyllead, said quantity being up to about 6 milliliters of tetraethyllead per gallon, an organic halide scavenger capable of reacting with the lead during combustion in the engine to form relatively volative lead halide, and β-(chloropropyl)-thionophosphate, the phosphorus-to-lead atom ratio being from about 0.2:3 to about 0.8:3.

7. The composition of claim 6 further characterized in that said scavenger consists essentially of about 0.5 theory of bromine-containing scavenger and about 1.0 theory of chlorine-containing scavenger, based upon the amount of tetraethyllead present.

8. Gasoline containing an antiknock quantity of tetraethyllead, said quantity being up to about 6 milliliters of tetraethyllead per gallon, about 0.5 theory of bromine as ethylene dibromide, about 1.0 theory of chlorine as ethylene dichloride and β-(chloropropyl)-thionophosphate present in amount such that that the phosphorus-to-lead atom ratio is from about 0.2:3 to about 0.6:3.

9. A fuel adjuvant consisting essentially of tetraethyllead, about 0.5 theory of bromine as ethylene dibromide, about 1.0 theory of chlorine as ethylene dichloride and β-(chloropropyl)-thionophosphate present in amount such that the phosphorus-to-lead atom ratio is from about 0.2:3 to about 0.6:3.

10. Gasoline containing an antiknock quantity of tetraethyllead, said quantity being up to about 3 milliliters of tetraethyllead per gallon, about 0.5 theory of bromine as ethylene dibromide, about 1.0 theory of chlorine as ethylene dichloride, and β-(chloropropyl)-thionophosphate present in amount such that the phosphorus-to-lead atom ratio is about 0.4:3.

References Cited in the file of this patent

UNITED STATES PATENTS

| | | |
|---|---|---|
| 2,157,164 | Daly et al. | May 9, 1939 |
| 2,340,331 | Knutson | Feb. 1, 1944 |
| 2,405,560 | Campbell | Aug. 13, 1946 |
| 2,427,173 | Withrow | Sept. 9, 1947 |
| 2,589,326 | Oberright | Mar. 18, 1952 |
| 2,589,675 | Cooke et al. | Mar. 18, 1952 |
| 2,610,978 | Lanham | Sept. 16, 1952 |
| 2,765,220 | Yust et al. | Oct. 2, 1956 |

FOREIGN PATENTS

| | | |
|---|---|---|
| 500,535 | Belgium | Jan. 31, 1951 |
| 668,536 | Great Britain | Mar. 19, 1952 |
| 683,405 | Great Britain | Nov. 26, 1952 |